(12) United States Patent
Oberhofer et al.

(10) Patent No.: US 12,330,257 B2
(45) Date of Patent: Jun. 17, 2025

(54) HANDHELD WORK APPARATUS HAVING A WORK TOOL

(71) Applicant: Andreas Stihl AG & Co. KG, Waiblingen (DE)

(72) Inventors: Felix Oberhofer, Stuttgart (DE); Marcus Jenke, Weil der Stadt (DE); Franziska Kern, Stuttgart (DE); Thomas Maier, Ostfildern (DE); Verena Mann, Remshalden (DE); Lars Bathke, Rudersberg (DE); Roland Mandel, Stuttgart (DE); Benedikt Posner, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/615,833

(22) Filed: Mar. 25, 2024

(65) Prior Publication Data

US 2024/0261921 A1  Aug. 8, 2024

Related U.S. Application Data

(63) Continuation of application No. 17/020,482, filed on Sep. 14, 2020, now Pat. No. 11,958,155.

(51) Int. Cl.
| | |
|---|---|
| *B23Q 5/00* | (2006.01) |
| *B23Q 5/58* | (2006.01) |
| *B25F 5/02* | (2006.01) |
| *B27B 17/08* | (2006.01) |

(52) U.S. Cl.
CPC ............... *B23Q 5/58* (2013.01); *B25F 5/02* (2013.01); *B27B 17/08* (2013.01)

(58) Field of Classification Search
CPC .................................. B23Q 5/58; B25F 5/02
See application file for complete search history.

(56) References Cited

U.S. PATENT DOCUMENTS

| | | | |
|---|---|---|---|
| 5,988,241 A | 11/1999 | Bosten et al. | |
| 6,091,035 A | 7/2000 | Campbell et al. | |
| 8,276,685 B2 | 10/2012 | Hozumi et al. | |
| 10,014,128 B2* | 7/2018 | Kannan | B25F 5/02 |
| 10,195,703 B2 | 2/2019 | Boeck et al. | |
| 2007/0144310 A1* | 6/2007 | Pozgay | H01H 9/061 |
| | | | 200/178 |
| 2013/0161161 A1* | 6/2013 | Parrinello | B25F 5/00 |
| | | | 200/43.17 |

FOREIGN PATENT DOCUMENTS

| | | |
|---|---|---|
| CN | 206471261 U | 9/2017 |
| DE | 103 23 544 A1 | 12/2004 |
| EP | 2 202 035 A2 | 6/2010 |
| EP | 2 794 187 B1 | 10/2014 |
| JP | 2007-299602 A | 11/2007 |

* cited by examiner

*Primary Examiner* — Eyamindae C Jallow
(74) *Attorney, Agent, or Firm* — Walter Ottesen, P.A.

(57) ABSTRACT

A handheld work apparatus includes a work tool. The work apparatus defines a longitudinal plane and includes a handle having a longitudinal axis. The blocking lever is mounted so as to be pivotable about a rotational axis. The blocking lever blocks the actuating lever in a blocking or disable position and enables the actuating lever for actuation in at least one operating enable position. In the direction of view perpendicular to the longitudinal plane, the longitudinal axis of the handle and the rotational axis of the blocking lever conjointly define an angle ($\alpha$). The angle ($\alpha$) lies in a range of from 10° to 60°.

13 Claims, 11 Drawing Sheets

HANDHELD WORK APPARATUS HAVING A WORK TOOL

CROSS-REFERENCE TO RELATED APPLICATIONS

This application is a continuation application of U.S. patent application Ser. No. 17/020,482, filed Sep. 14, 2020, and claims priority of European patent application no. 19 197 112.6, filed Sep. 12, 2019, and the entire content of both are incorporated herein by reference.

BACKGROUND

There are known handheld work apparatuses whose actuating lever for actuation of a drive motor is blocked by a safety means, for example a blocking lever. In order to actuate the drive motor, the blocking lever and the actuating lever must therefore be pressed in succession, or at least simultaneously. The arrangement of the levers is usually selected in such a manner that the operator is able to press both levers with only one hand. A disadvantage of such work apparatuses is that actuating both levers at the same time is often inconvenient and not very intuitive. The operator may possibly even have to relinquish their firm grip on the handle of the work apparatus to be able to press both levers simultaneously.

SUMMARY

It is an object of the disclosure to further develop a handheld work apparatus in such a manner that it is made possible for the operator to operate the work apparatus ergonomically.

The handheld work apparatus includes a handle defining a longitudinal axis. The blocking lever is mounted so as to be pivotable about a rotational axis of the blocking lever. The work apparatus includes a longitudinal plane, the longitudinal plane including the longitudinal axis of the handle and being parallel to the rotational axis of the blocking lever. The longitudinal plane in this case runs parallel to the rotational axis of the blocking lever even if the rotational axis of the blocking lever lies in the longitudinal plane. In the direction of view perpendicular to the longitudinal plane, the longitudinal axis of the handle encloses an angle with the rotational axis of the blocking lever, the angle being in a range of from 10° to 60°.

When operating the work apparatus, the operator holds the work apparatus by its handle. In this hand position, the operator is able to freely move the thumb and at least the index finger. The blocking lever and actuating lever are advantageously arranged in such a manner that the blocking lever can be pressed with the thumb, and the actuating lever, which is thereby unlocked, can then be operated with the index finger or another free finger.

The disclosure is based on the realization that it is ergonomic for the operator if the operator merely has to pivot their thumb while holding the handle of the work apparatus. Due to the arrangement, according to the disclosure, of the longitudinal axis of the handle and the rotational axis of the blocking lever, actuation with a mere pivot movement of the thumb relative to the hand is possible. A movement of the thumb in longitudinal direction can thus be avoided. In the case of an arrangement of the rotational axis of the blocking lever parallel to the longitudinal axis of the handle, the thumb could slide off the blocking lever during a pivot movement. To avoid this, the operator would have to push their thumb forward in the longitudinal direction toward the blocking lever, such that the operator would have to relinquish their firm grip on the handle of the work apparatus.

The angular position according to the disclosure between the rotational axis of the blocking lever and the longitudinal axis of the handle allows the blocking lever to be operated by the thumb within the natural pivot movement of the thumb. It is not necessary to compensate the thumb movement by a movement in longitudinal direction of the handle. Ergonomic actuation of the blocking lever, as well as ergonomic use of the work apparatus, is made possible.

The angle is preferably in a range of from 15° to 45°. This enables a particularly ergonomic actuation.

In the case of particularly curved handles, the longitudinal axis is a tangent to the center-line of the handle. The tangent lies on the center-line at the front end of the handle. The center-line runs through the centroids of the individual mutually parallel cross-sectional planes of the handle.

As further, independent disclosure it is provided that a spring unit for the blocking lever acts in combination with a contour on the blocking lever, the contour extending over an angular portion about the rotational axis of the blocking lever and having a lower portion realized in the direction of the rotational axis of the blocking lever. It is provided that the spring unit, adjacent in the lower portion of the contour, biases the blocking lever in the direction of the blocking position.

When the blocking lever is actuated, it rotates about its rotational axis of the blocking lever, the spring unit being deflected by the contour of the blocking lever in the direction away from the rotational axis of the blocking lever. The spring unit exerts a restoring force upon the contour, which in turn exerts a restoring moment upon the blocking lever. This causes the blocking lever, in the deflected position, to be biased in the direction of its blocking position. When the blocking lever is released by the operator, the spring unit presses the blocking lever over the contour back into the blocking position.

Preferably, two enable positions are provided. Advantageously, the blocking lever, starting from its blocking position, can be pivoted, in a first pivot direction about the rotational axis of the blocking lever, into the first enable position and, in a second pivot direction that is opposite to the first pivot direction, into the second enable position. Actuation in both directions is thus possible. This is advantageous, in particular, to enable ergonomic operation for right-handed and left-handed users. Preferably, the spring unit, in the case of an angular deflection of the blocking lever from the blocking position, effects a restoring force that, for the same angular deflection, is equal in magnitude in the first pivot direction and in the second pivot direction. Work apparatuses are used with differing working techniques and in a variety of positions. This is reflected, for example, in differing operator grip positions. The possibility of unblocking the blocking lever in both pivot directions makes it easier for the operator to unblock the work apparatus in a variety of positions and with differing grip positions.

Preferably, the spring unit, when the blocking lever is in the blocking position, is biased in such a manner that the biasing force vector lies in the longitudinal plane. The biasing force vector corresponds to the vector of the spring force. Preferably, the spring unit, when the blocking lever is in the blocking position, is biased in the direction of the rotational axis of the blocking lever. In order to actuate the blocking lever, the operator must apply a certain minimum actuating force, thereby preventing accidental actuation of the blocking lever.

It is provided, advantageously, that the spring unit slides on the contour of the blocking lever as the blocking lever is being pivoted. The spring unit is thus in constant contact with the contour of the blocking lever and, via the contour, permanently exerts a restoring force upon the blocking lever.

The spring unit is preferably realized as one piece, which favors the generation of a restoring force that is of equal magnitude for the same amount of deflection in both pivot directions. The spring unit is advantageously realized as a leaf spring. It is advantageously provided that the contour of the blocking lever is formed from two legs arranged at an angle in relation to each other. The angle between the legs arranged in relation to each other results from the tangents lying against the legs in the lower portion of the contour. The angle advantageously opens in the direction away from the rotational axis of the blocking lever. In an alternative embodiment, it may also be expedient to configure the contour in such a manner that the angle between the legs opens away from the rotational axis. The angle is preferably in a range of between 70° and 130°, advantageously between 90° and 110°. The angle is preferably approximately 100°. The legs are preferably realized symmetrically in relation to each other. This symmetry means that the restoring forces for the two pivot directions of the blocking lever are of equal magnitude.

The symmetrical contour of the blocking lever allows a secured position of the blocking lever in the blocking position, since the biasing force of the spring element is divided by the symmetrical contour into mutually compensating force vectors. The resulting torques balance each other out. The function of the blocking lever as a blocking element for the switching lever is always ensured, even irrespective of the level of the biasing force of the spring element.

It is advantageously provided that the blocking lever has at least two wing elements for actuation of the blocking lever, which are arranged opposite each other with respect to the longitudinal plane. The wing elements may be arranged in an offset manner in relation to each other in a direction parallel to the rotational axis of the blocking lever and/or in a direction parallel to the longitudinal plane and perpendicular to the rotational axis. In the preferred embodiment, the wing elements are arranged symmetrically in relation to each other, with respect to the longitudinal plane, when the blocking lever is in the blocking position. This allows the work apparatus to be easily gripped and unblocked with either the left or right hand. The operator can therefore switch between the left and right hand to hold the work apparatus. In addition, there are no differences in the operation of the work apparatus for left-handed and right-handed users. The actuating lever and the blocking lever can be operated ergonomically equally well by both hands. Preferably, the wing elements, when the blocking lever is in the blocking position, are accessible both from the side in the first pivot direction and from the side in the second pivot direction. Accordingly, the operator, when holding the handle, can use their thumb in a downward movement on a wing element to pivot the blocking lever in the first pivot direction, and to pivot the blocking lever in the second pivot direction by an upward movement of the thumb on the same wing element. This allows easy unblocking of the blocking lever with differing grip positions.

As a further, independent disclosure, it is provided that the blocking lever, starting from its blocking position, can be pivoted, in a first pivot direction and in a second pivot direction that is opposite to the first pivot direction, about the rotational axis of the blocking lever, the spring unit having a first spring leg and a second spring leg. The spring unit is realized in such a manner that, when the blocking lever is deflected in the first pivot direction, the first spring leg, bearing against the blocking lever, effects a restoring force upon the blocking lever in the direction of the blocking position. When the blocking lever is actuated in the first pivot direction, the first spring leg of the spring unit is deflected, thereby tensioning the spring unit. The spring leg realizes a restoring force that acts upon the blocking lever. When the operator releases the blocking lever, such that the actuation force is removed and the restoring force of the spring unit acts upon the blocking lever, the latter returns to the blocking position.

The spring unit is preferably realized in such a manner that, when the blocking lever is deflected in the second pivot direction, the second spring leg, bearing against the blocking lever, effects a restoring force upon the blocking lever in the direction of the blocking position. The blocking lever can thus be pivoted in both pivot directions, thereby achieving improved ergonomics for the operator.

The spring unit is preferably clamped-in on the blocking lever. The spring unit can thus be clamped-in in the blocking lever before the work apparatus is mounted, and the blocking lever, with the spring unit, can be mounted easily as an assembly. Preferably, the housing forms a first rotational stop and a second rotational stop, the first rotational stop advantageously limiting a rotational movement of the first spring leg in the second pivot direction, and the second rotational stop advantageously limiting a rotational movement of the second spring leg in the first pivot direction. When the spring unit effects a restoring force upon the blocking lever, the spring unit is supported on the housing.

As a further, independent disclosure, it is provided that the blocking lever has three wing elements for actuation of the blocking lever. This allows the operator to actuate the blocking lever in an ergonomic manner even when the work apparatus is being gripped laterally. A lateral grip position is usual, for example, in the case of hedge trimmers. For example, when a hedge is cut along its horizontal top side, the operator must move the hedge trimmer in a horizontal plane. To do this, the operator usually holds the hedge trimmer in an upper grip position. If the operator is cutting the hedge along its vertical sides, the operator will move the hedge trimmer with an upward and downward movement in a vertical plane, turning the hedge trimmer sideways, such that the cutting tool of the hedge trimmer is also aligned parallel to the sides of the hedge. To do this, the operator usually holds the hedge trimmer turned by 90° about the longitudinal axis of the handle relative to the upper grip position. In the case of conventional work apparatuses, it is difficult for the operator to operate the blocking lever using such a grip position. The three wing elements arranged on the blocking lever allow the operator to easily operate the blocking lever in any grip position. Such a blocking lever configuration can also be advantageous for other work apparatuses that require differing grip positions.

Preferably one wing element of the three wing elements is an upper wing element. The upper wing element is advantageously arranged, on the blocking lever, opposite the actuating lever with respect to the rotational axis of the blocking lever. The upper wing element preferably lies in the longitudinal plane of the handle when the blocking lever is in the blocking position. Preferably, two of the three wing elements are lateral wing elements, the two lateral wing elements of the blocking lever being arranged opposite each other with respect to the longitudinal plane of the handle, on the blocking lever. The lateral wing elements may be arranged in an offset manner in relation to one another, in a direction parallel to the rotational axis of the blocking lever and/or in a direction parallel to the longitudinal plane and perpendicular to the rotational axis, when the blocking lever is in the blocking position. In the preferred embodiment, the lateral wing elements are arranged symmetrically in relation to each other with respect to the longitudinal plane when the blocking lever is in the blocking position. The two lateral wing elements of the blocking lever have an equal angular distance, around the rotational axis of the blocking lever, from the upper wing element. Accordingly, the lateral wing elements are preferably arranged symmetrically in relation to the upper wing element. The angular distance is at least 60°, preferably at least 90°. Due to the laterally arranged wing elements, the work apparatus can be gripped, and the blocking lever can be operated, with both the right and left hand. The upper wing element allows ergonomic operation of the blocking lever, in particular when the work apparatus is being held sideways.

BRIEF DESCRIPTION OF DRAWINGS

The invention will now be described with reference to the drawings wherein.

DETAILED DESCRIPTION

Figure 1:
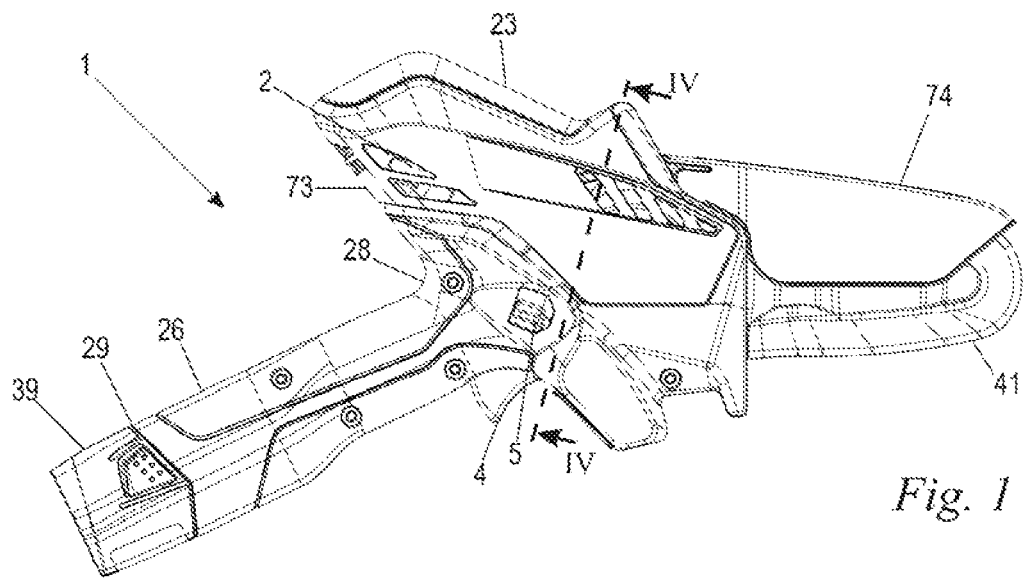
FIG. 1 is a side view of a work apparatus according to the disclosure.
Figure 2:
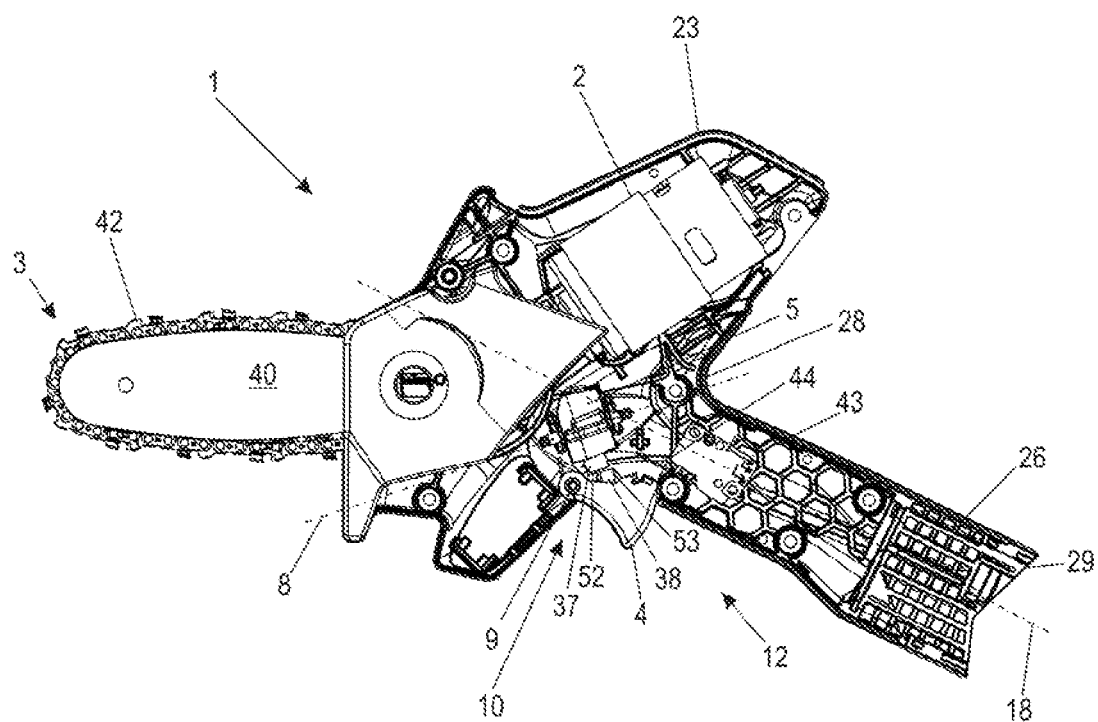
FIG. 2 is a side view of the work apparatus according to FIG. 1, with open housing.

FIG. 1 shows a handheld work apparatus according to the disclosure, which in the embodiment is realized as a brushcutter. In an alternative embodiment, the work apparatus 1 may also be realized as a hedge trimmer, power saw, blowing apparatus, or the like. Moreover, the work apparatus 1 may also be realized as a work apparatus having a shank, for example as a pole-mounted pruner, hedge trimmer, brushcutter, lawn trimmer, power scythe, or the like. The work apparatus 1 includes a housing 23, having a handle 26. The handle 26 extends forward, along its longitudinal axis 18, from its rear end 29 toward its front end 28. At the front end 28 the handle 26 is connected to the main body 73 of the housing 23. The work apparatus 1 includes a work tool 3, which in the embodiment is a guide bar 40 that has a saw chain 42 (FIG. 2). The guide bar 40 projects forward on the end of housing 23 opposite to the handle 26. In FIG. 1, there is a cut protection device 41 placed on the guide bar 40. Arranged on the housing 23 there is a pivotable hood 74, which extends along the guide bar 40 and projects at least partially over the guide bar 40. The hood 74 can be pivoted in an upward direction away from the guide bar 40. The saw chain 42 is arranged around the guide bar 40 and is driven by a drive motor 2 arranged in the housing 23. In the embodiment, the drive motor 2 is realized as an electric motor that is powered by a battery 39. The battery 39 is arranged at the rear end 29 of the handle 26. The electric motor may also be supplied with power via a connecting cable. In an alternative embodiment, the drive motor 2 may 2 may also be realized as a combustion engine, in particular as a two-stroke engine or a gas/oil-lubricated four-stroke engine.

As shown in FIG. 1, the work apparatus 1 includes an actuating lever 4 for operating drive motor 2, and a blocking lever 5 for the actuating lever 4. The actuating lever 4 and the blocking lever 5 are arranged on the housing 23, at the front end 28 of the handle 26. When the blocking lever 5 is in a blocking position 10, the actuating lever 4 is blocked by the blocking lever 5. The actuating lever 4 blocked by the blocking lever 5 is in an unactuated position. When the blocking lever 5 is in an enable position 11, 11', the actuating lever 4 is enabled. When the blocking lever 5 is in the enable position 11, 11', the operator can press the actuating lever 4 into an operating position 13 (FIGS. 9, 10) and thus operate the drive motor 2.

As shown in FIG. 2, the blocking lever 5 is mounted on housing 23 so as to be pivotable about its rotational axis 8 of the blocking lever 5. The actuating lever 4 is mounted on housing 23 so as to be pivotable about a pivot axis 9. The pivot axis 9 is perpendicular to a longitudinal plane 27 (FIG. 3) of the handle 26, the longitudinal plane 27 including the longitudinal axis 18 of the handle 26 and being parallel to the rotational axis 8 of the blocking lever 5. The term "parallel" also means that both the rotational axis 8 of the blocking lever 5 and the longitudinal axis 18 can be included in the longitudinal plane 27. The blocking lever 5 includes a flag 37, having an end face 52, the flag 37 being arranged on the side of the blocking lever 5 that faces toward the actuating lever 4. The actuating lever 4 includes a counterflag 38, having a counter end face 53, which is arranged on the side of the actuating lever 4 that faces toward the blocking lever 5. The end face 52 of the flag 37 and the counter end face 53 of the counterflag 38 are aligned so as to face each other in a blocking position 10. When the actuating lever 4 is pressed, the end face 52 and the counter end face 53 contact each other, as a result of which pivoting of the actuating lever 4 about the pivot axis 9 is blocked. When the blocking lever 5 is pivoted into an enable position 11, 11' (FIGS. 7, 8), the blocking lever 5 enables the actuating lever 4. In this case, the flag 37 of the blocking lever 5 is moved out of the pivot path of the counterflag 38 of the actuating lever 4. The actuating lever 4 can be pivoted with its counterflag 38 about the pivot axis 9 without thereby contacting the flag 37 of the blocking lever 5.

As shown in FIG. 2, the work apparatus 1 includes a switch 43 that has a contact tongue 44 for actuation of the drive motor 2. When the actuating lever 4 is pivoted, the actuating lever 4 depresses the contact tongue 44, as a result of which the drive motor 2 is switched on. In an alternative embodiment, it may also be expedient to provide a switch 43 without contact tongue 44. Such a switch 43 would be actuated directly by the actuating lever 4. The actuating lever 4 can only be used to switch drive motor 2 on or off. In an alternative embodiment of the work apparatus 1, the rotational speed of the drive motor 2, which is realized as an electric motor, can be infinitely adjusted via actuating lever 4.

Figure 3:
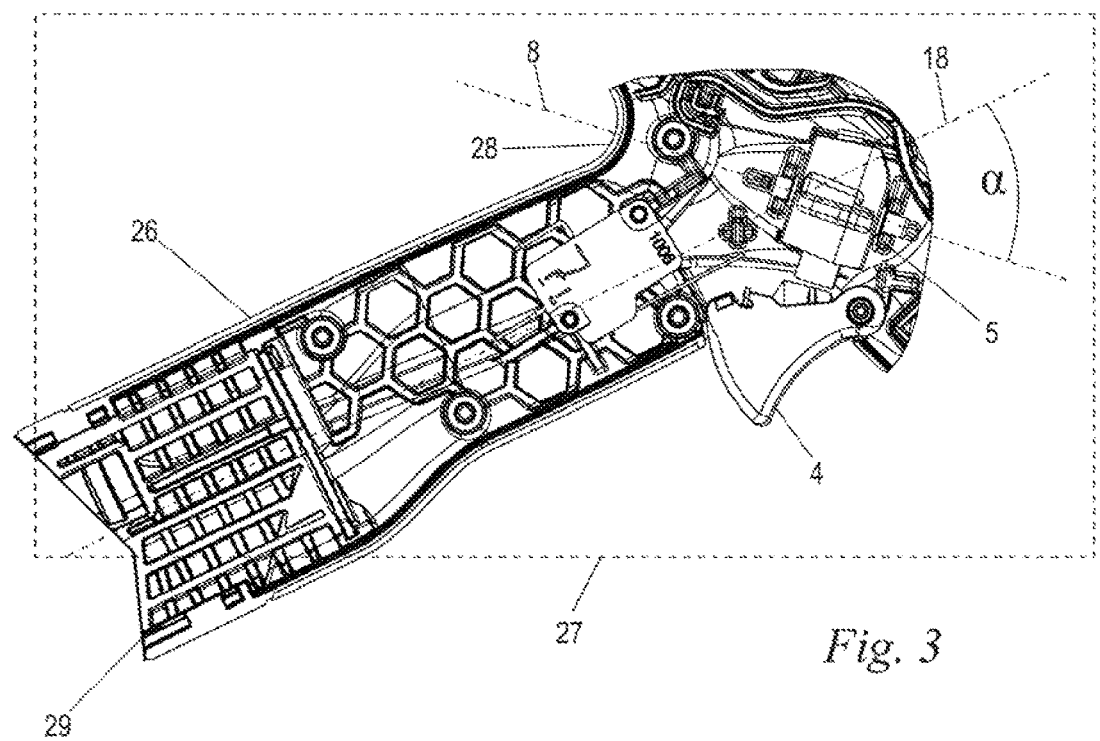
FIG. 3 is a detail representation of the work apparatus according to FIG. 1, with open housing.

As shown in FIG. 3, in the direction of view perpendicular to the longitudinal plane 27 the longitudinal axis 18 of the handle 26 and the rotational axis 8 of the blocking lever 5 enclose an angle α. The angle α is in a range of from 10° to 60°, in particular 15° to 45°. In the embodiment the angle α is, in particular, approximately 45°. If the operator grips the work apparatus 1 by the handle 26, the operator can use their thumb to actuate the blocking lever 5. The operator in this case only needs to execute a pivot movement with their thumb. Due to the inclined arrangement of the longitudinal axis 18 and the rotational axis 8 of the blocking lever 5, in other words due to the rotated mounting position of the blocking lever 5 relative to the handle 26, the pivot movements 19, 19' of the blocking lever 5 are within the pivot range of the thumb. This results in a particularly ergonomic operation of the work apparatus.

In an alternative embodiment of the work apparatus, not shown, it may be expedient to make the handle curved. In such embodiments the longitudinal axis 18 is defined by a tangent to a center-line of the handle 26 at the front end. The center-line runs through the centroids of the individual mutually parallel cross-sectional planes of the handle 26.

Figure 4:
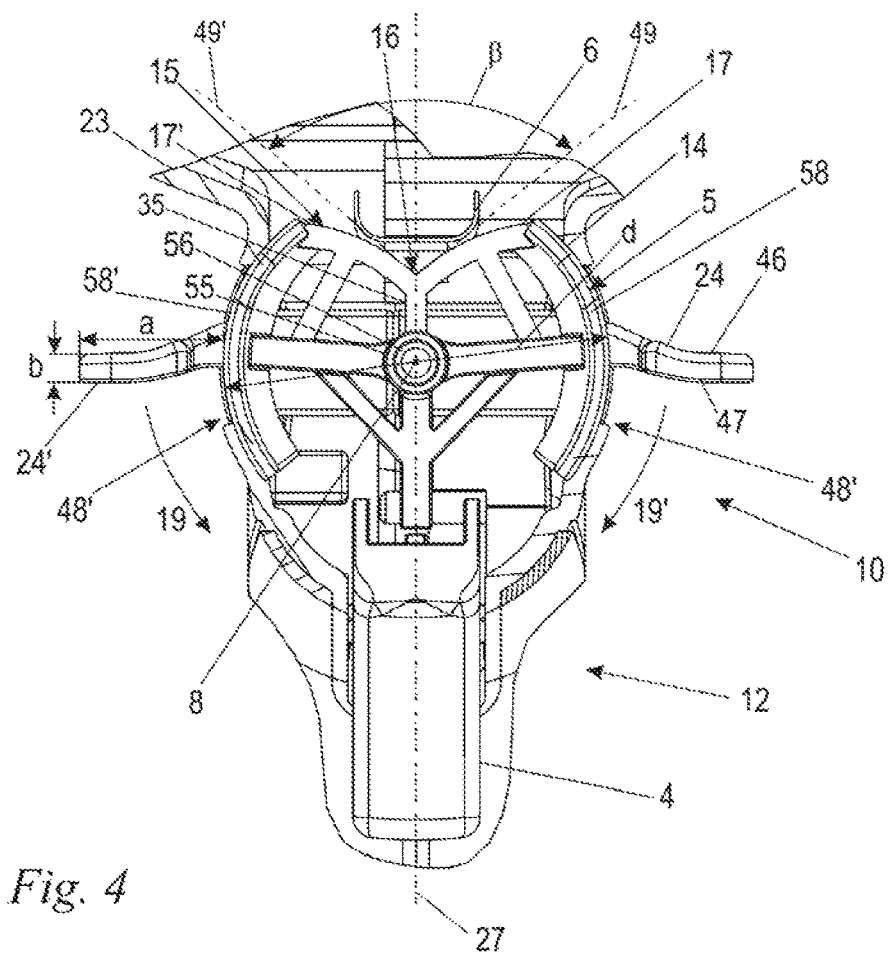
FIG. 4 is a detail sectional representation of the work apparatus in the direction of arrow 4 according to FIG. 1.
Figure 5:
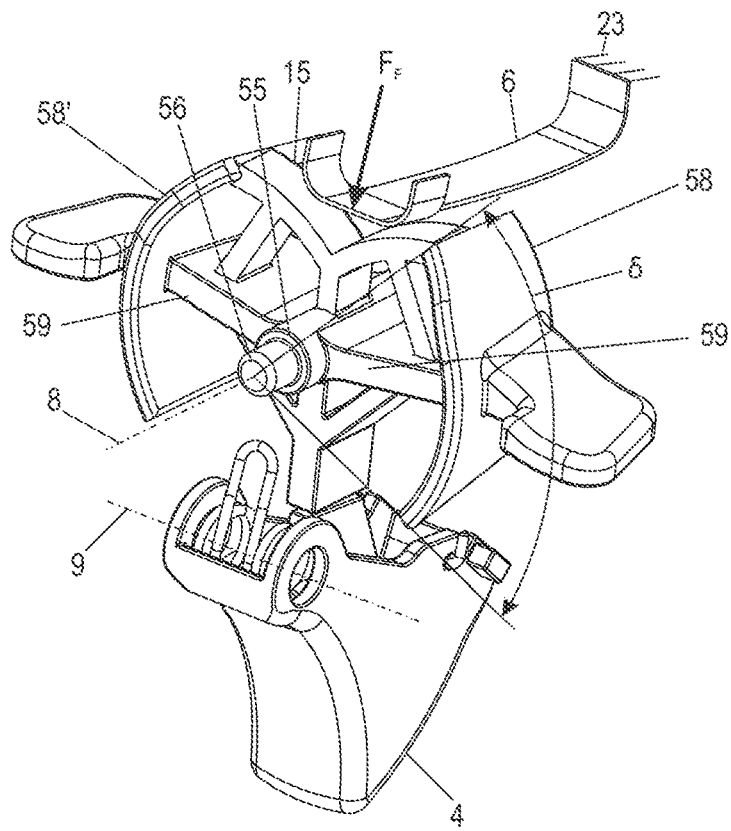
FIG. 5 is a perspective representation of the blocking lever with the spring unit of the work apparatus according to FIG. 1 in a blocking position.

As shown in FIG. 4, the blocking lever 5 includes a hub 55, the blocking lever 5 being mounted, via two bearing lugs 56 (FIG. 6), so as to be pivotable about the rotational axis 8 of the blocking lever 5. The bearing lugs 56 are advantageously formed onto the blocking lever 5. However, the bearing lugs 56 may also be formed by a separate shaft and mounted so as to be rotatable, about the rotational axis 8 of the blocking lever 5, relative to housing 23. As shown in FIGS. 4 and 5, in the embodiment the blocking lever 5 includes two wall portions 58, 58', which are in the form of a circle segment. The wall portions 58, 58' are connected to the hub 55 via a central strut 59. In a blocking position 10, the two wall portions 58, 58' are arranged opposite each other with respect to the longitudinal plane 27. The wall portions 58, 58' are arranged and realized symmetrically in relation to each other. The wall portions 58, 58' each extend over an angle δ (FIG. 5) around the rotational axis 8, the angle δ being at least 60°, in particular at least 75°, preferably approximately 90°. The wall portions 58, 58' form a peripheral wall 14 of the blocking lever 5, having a diameter d.

As shown in FIG. 4, the blocking lever 5 includes two lateral wing elements 24, 24' for actuation of the blocking lever 5. The two lateral wing elements 24, 24' are arranged on the wall portions 58, 58'. The two lateral wing elements 24, 24' are realized, in particular, as one piece with the wall portions 58, 58'. The lateral wing elements 24, 24' extend, approximately perpendicularly in relation to the longitudinal plane 27, away from the peripheral wall 14 of the blocking lever 5. The lateral wing elements 24, 24' in this case project out of openings 48, 48' provided in the housing 23, making the blocking lever 5 accessible to the operator outside housing 23. The openings 48, 48' are arranged opposite the blocking lever 5 in such a manner that the wall portions 58, 58' cover the interior space enclosed by the housing 23 at the openings 48, 48'. The wing elements 24, 24' are arranged oppositely with respect to the longitudinal plane 27 of the handle 26, on the blocking lever 5. The wing elements 24, 24' are symmetrical in relation to each other with respect to the longitudinal plane 27.

As shown in FIG. 4, the wing elements 24, 24' each have a width a measured perpendicularly in relation to the longitudinal plane 27. In the embodiment, the width a corresponds to at least 15%, in particular at least 30%, preferably 38% of the diameter d of the blocking lever 5. The width a of the wing elements 24, 24' corresponds to at most 50% of the diameter d of the blocking lever 5. The wing elements 24, 24' have a wing upper side 46 that faces away from the actuating element 4, and a wing underside 47 that faces toward the actuating element 4. In addition, the lateral wing elements 24, 24' have a height b that corresponds to the distance between the wing underside 47 and the wing upper side 46 measured in the direction perpendicular to the rotational axis 8 and parallel to the longitudinal plane 27. The height b corresponds to at most 20% of the diameter d of the blocking lever 5. The lateral wing elements 24, 24' lie in a plane with the rotational axis 8, the plane being perpendicular to the longitudinal plane 27.

As shown in FIG. 4, the work apparatus 1 includes a spring unit 6. The spring unit biases the blocking lever 5 in the direction of the blocking position 10. The blocking lever 5 has a contour 15, which acts in combination with the spring unit 6. The contour 15 is formed by two legs 17, 17', which are connected to each other in a lower portion 16. The lower portion 16 in this case is the portion of the contour 15 that is closest to the rotational axis 8, and forms a depression in the contour 15 that extends toward the rotational axis 8.

The individual legs 17, 17' are curved. The legs 17, 17' run from radially outside to inside with respect to the rotational axis 8 of the blocking lever 5. In the embodiment, the blocking lever 5 is realized in such a manner that, in the blocking position 10, the legs 17, 17' run in an arc from the upper ends of the wall portions 58, 58' that face away from the actuating lever 4, toward the longitudinal plane 27, and are supported by a connecting strut 35 at hub 55. The contour 15 formed by the legs 17, 17' corresponds approximately to the shape of a V. The contour 15 is aligned in such a manner that the lower portion 16 of the contour 15 is arranged toward the rotational axis 8 of the blocking lever 5, and the contour 15 opens in its V-shape away from the rotational axis 8 of the blocking lever 5. In the blocking position, the longitudinal plane 27 runs centrally through the lower portion 16. The tangents 49, 49' that lie on the legs 17 at the lower portion 16 enclose an angle β, which in the embodiment lies in a range of between 70° and 130°, preferably between 90° and 110°. The angle β corresponds to approximately 100°.

As shown in FIGS. 4 and 5, the spring unit 6 bears against the contour 15 of the blocking lever 5. The spring unit 6 acts with a spring force $F_F$ (FIG. 5) upon the contour 15 in the direction of the rotational axis 8 of the blocking lever 5. The biasing force vector, which corresponds to the vector of the spring force $F_F$, lies in the longitudinal plane 27. In an alternative embodiment, the contour 15 may also be configured in such a manner that the contour 15 opens downwards in its V-shape toward the rotational axis 8. In such an embodiment, the spring unit 6 would be arranged between the rotational axis 8 and the contour 15, and would act upon the contour 15 away from the rotational axis 8. In the embodiment, the spring unit 6 is realized as a leaf spring. In an alternative embodiment, the spring unit 6 may also be realized as a leg spring or similar. The spring unit 6 is symmetrical with respect to the longitudinal plane 27.

As shown in FIG. 4, the blocking lever 5 includes a first pivot direction 19, and a second pivot direction 19' that is opposite to the first pivot direction 19. When the blocking lever 5 is pivoted in one of the two pivot directions 19, 19', about the rotational axis 8 of the blocking lever 5, as shown in FIGS. 7 to 10, the spring unit 6 is pressed by the contour 15 of the blocking lever 5 in a direction away from the rotational axis 8 of the blocking lever 5. The spring unit 6 in this case slides along one of the two legs 17, 17' of the contour 15, with the spring force $F_F$ acting upon the contour 15 of the blocking lever 5 increasing. At the point of contact between the spring unit 6 and contour 15, a restoring force $F_R$, resulting from the spring force $F_F$, acts upon the contour 15, approximately normal to the surface. The restoring force $F_R$ effects a restoring moment $M_R$ that counteracts the pivot direction, in the embodiment the first pivot direction 19. If blocking lever 5 is released by the operator, no actuating force acts upon blocking lever 5. Only the spring force $F_F$ acts upon the blocking lever 5 through the spring unit 6. The restoring force $F_R$ resulting from the spring force $F_F$ effects the restoring moment $M_R$, as a result of which the blocking lever 5 is rotated back into the blocking position 10.

Figure 7:
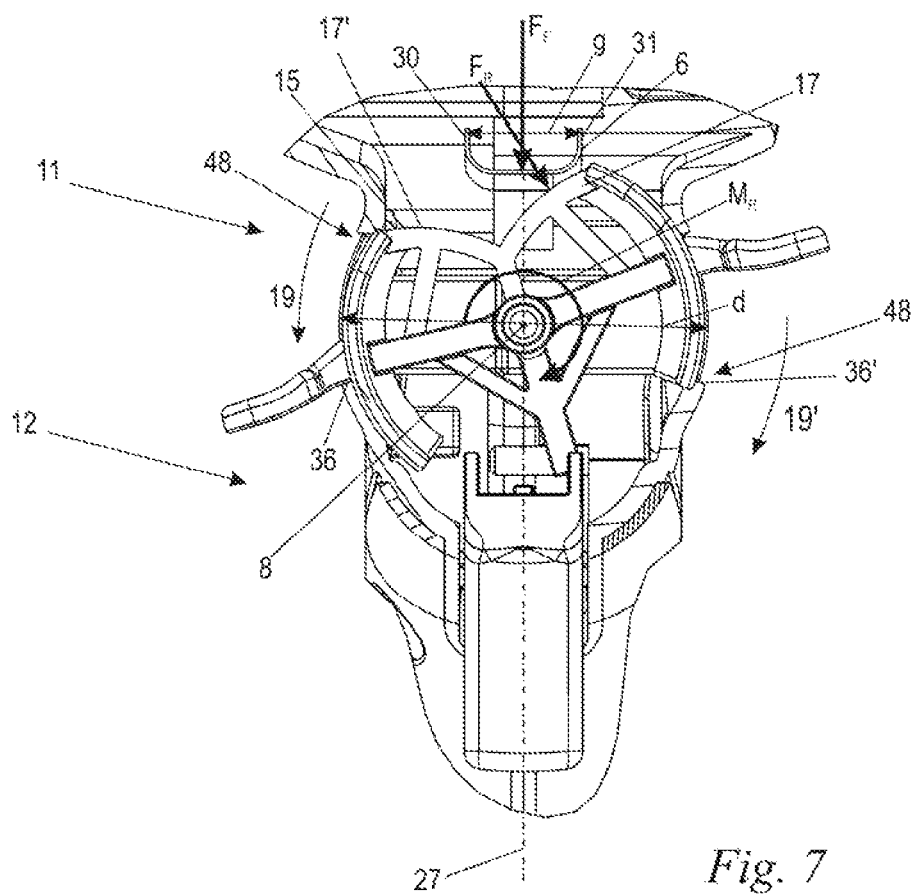
FIG. 7 is a detail sectional representation of the work apparatus along line IV-IV in FIG. 1, in a first enable position.
Figure 9:
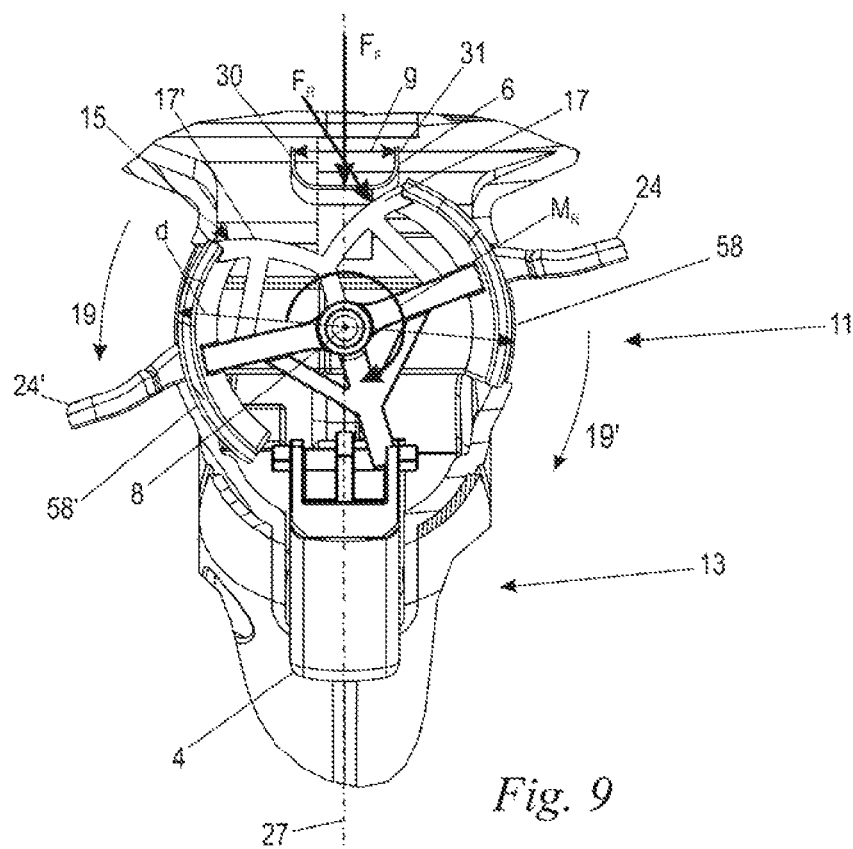
FIG. 9 is a detail sectional representation of the work apparatus along line IV-IV in FIG. 1, in an enable position and with the actuating lever actuated.

As shown in FIGS. 7 and 9, the spring unit 6 and the contour 15 generate an approximately constant restoring moment $M_R$ over the entire pivot path of the blocking lever. As the spring unit 6 deflects increasingly as a result of pivoting of the blocking lever 5, the spring force $F_F$ resulting therefrom increases. The contour 15, on the other hand, flattens off as the radial distance from the rotational axis 8 of the blocking lever 5 increases, in such a manner that the direction of the restoring force $F_R$ is directed closer to the rotational axis 8 of the blocking lever 5. Consequently, the lever arm of the restoring force $F_R$ also decreases toward the rotational axis 8 of the blocking lever 5, as a result of which the restoring moment $M_R$ remains approximately constant. The contour 15 is preferably realized in such a manner that, when the blocking lever 5 is pivoted, a restoring moment $M_R$ of approximately constant magnitude acts over the entire pivot range. In an alternative embodiment, however, the contour 15 may be realized according to the desired restoring moment $M_R$. Due to the symmetrical configuration of the legs 17, 17' of contour 15, the restoring force $F_R$ is also equal in magnitude for an equal deflection in the respective pivot direction 19, 19'. For the operator, this results in a particularly pleasing pivot behavior in all pivot directions 19, 19' of the blocking lever 5. The pivot behavior of the blocking lever 5 is the same, irrespective of which of the two lateral wing elements 24, 24' is operated and in which pivot direction 19, 19' one of the two lateral wing elements 24, 24' is pressed.

As shown in FIGS. 7 and 9, in the embodiment the spring unit 6 includes two mutually opposite spring legs 30 and 31, which are realized at the end of the spring unit 6 that bears against the contour 15. The spring legs 30, 31 extend in the direction away from the contour 15. In the preferred embodiment, the spring legs 30, 31 are realized as bent portions of the spring unit 6, the spring unit 6 having a rounded contact surface opposite the contour 15. This facilitates the upward and downward sliding of the spring unit 6 on the contour 15.

As shown in FIGS. 7 and 9, the spring unit 6 has a width g, measured perpendicularly in relation to the longitudinal plane 27, which corresponds to at least 20% of the diameter d of the blocking lever 5. Due to the wide configuration of the spring unit 6, when the blocking lever 5 is in the blocking position 10 the spring unit 6 bears against the contour 15 at two contact points, namely in each case on one of the two legs 17, 17' of the contour 15 (FIG. 4). The spring unit 6, which is biased in the direction of the rotational axis 8 of the blocking lever 5, thus exerts a restoring force $F_R$ on each of the two legs 17, 17' of contour 15. These restoring forces $F_R$ in turn cause opposing restoring moments $M_R$. Since the restoring moments $M_R$ are equal in magnitude, they cancel each other out, as a result of which the spring unit 6 is in static equilibrium with the blocking lever 5 in blocking position 10. Owing to the mutually counteracting restoring moments $M_R$, the blocking lever 5 is biased into its blocking position 10. As shown in FIGS. 7 and 9, spring unit 6 acts with the spring force $F_F$ upon the blocking lever 5 in the direction of the rotational axis 8 of blocking lever 5. Owing to the wide configuration of spring unit 6, however, the force on contour 15 is not applied in the direction of the rotational axis 8 of blocking lever 5, but offset from it. Consequently, large restoring moments $M_R$ can be generated even in the case of small deflections of the blocking lever 5.

As shown in FIG. 7, a lower edge 36, 36' of the openings 48, 48' of the housing 23 serves in each case as a rotational stop of the blocking lever 5. The lower edge 36, 36' is the edge of the openings 48, 48' of the housing 23 that is closest to the actuating lever 4. Thus, if the blocking lever 5 is arranged in the enable position 11, 11', the lower edge 36, 36' of the opening 48, 48' forms a stop for the wing element 24, 24'. Accordingly, the blocking lever 5 can be rotated in the first pivot direction 19 until the lateral wing element 24 comes with its upper side 46 against the lower edge 36 of the opening 48. In an alternative embodiment, it may also be expedient to provide the upper edges of the openings 48, 48' as a stop for the wing elements 24, 24'.

Figure 10:
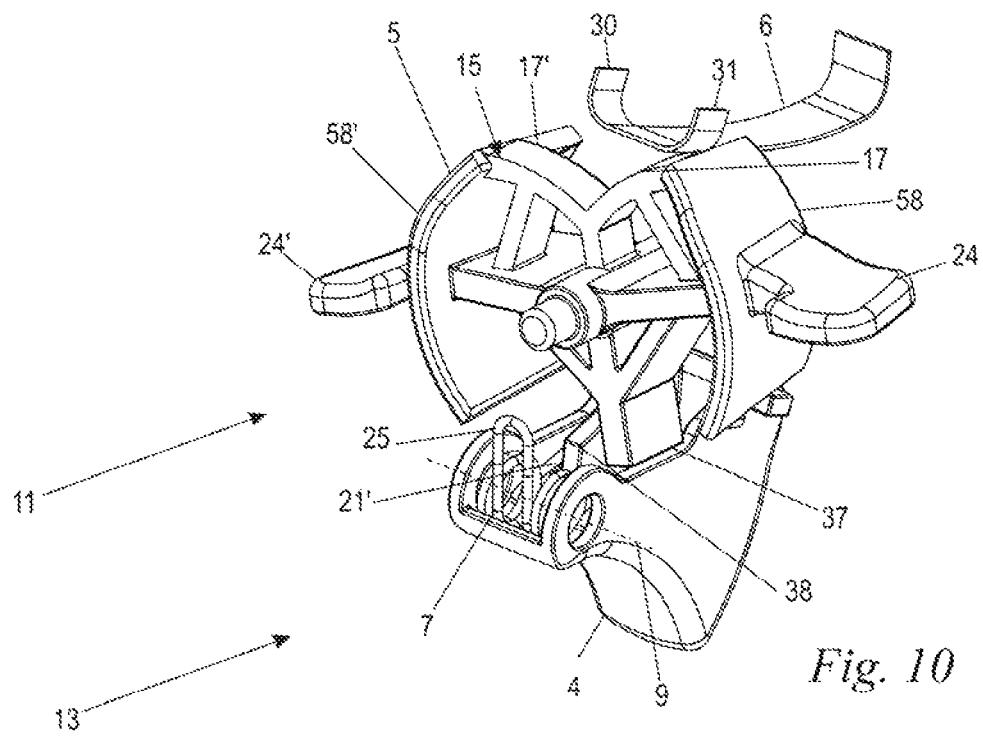
FIG. 10 is a perspective representation of the blocking lever with the spring unit in an enable position with the actuating lever actuated.

In FIGS. 9 and 10 the blocking lever 5 is represented pivoted into an enable position 11, and the actuating lever 4 is actuated and is in the operating position 13. The flag 37 of blocking lever 5 and the counterflag 38 of the actuating lever 4 do not contact each other.

Figure 6:
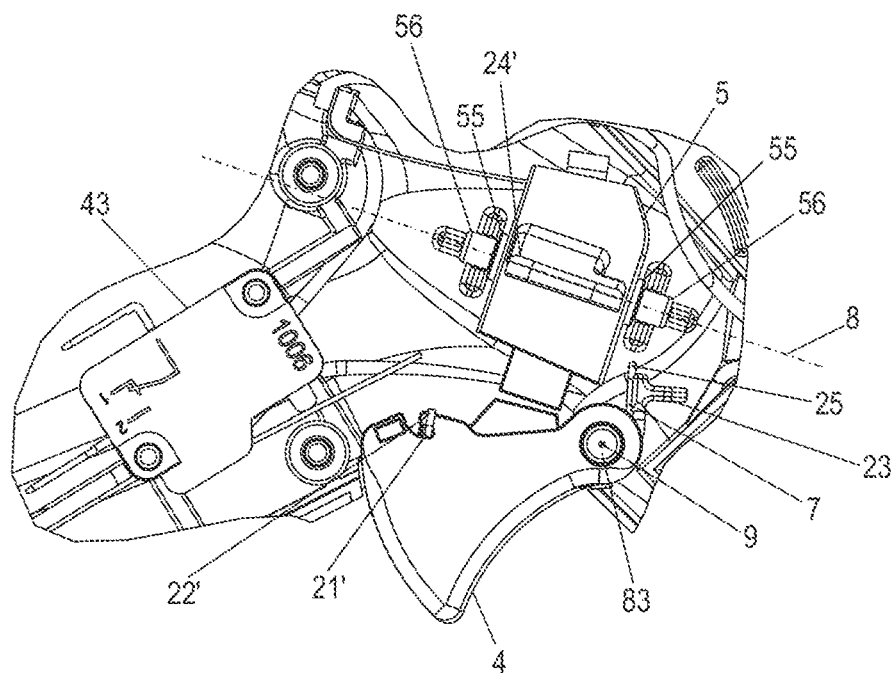
FIG. 6 is a detail lateral sectional representation of the blocking lever and actuating lever of the work apparatus according to FIG. 1.
Figure 8:
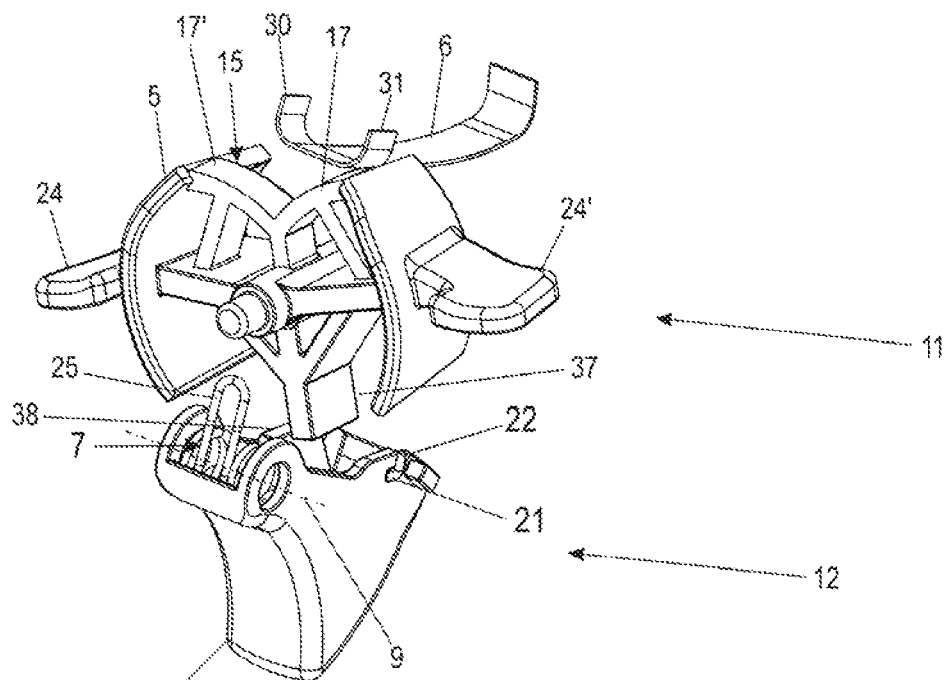
FIG. 8 is a perspective representation of the blocking lever with the spring unit, in a first enable position.

As shown in FIGS. 6, 8 and 10, the work apparatus 1 includes a spring element 7 that biases the actuating lever 4 in the direction of the unactuated position 12. In the embodiment, the spring element 7 is realized as a leg spring. The spring element 7 is realized symmetrically with respect to the longitudinal plane 27 in order to avoid undesired tilting moments on the actuating lever 4. The spring element 7 includes two spring legs 21, 21', which are clamped-in on a component composed of the housing 23 and actuating lever 4, the spring element 7 being supported, via a central spring portion 25, on the other component composed of the housing 23 and actuating lever 4. In the preferred embodiment, the central spring portion 25 of the spring element 7 is clamped-in on the housing 23 (FIG. 6). The spring legs 21, 21' of the spring element 7 are clamped-in, at their ends 22, 22', on the actuating lever 4. Preferably, the spring legs 21, 21' are additionally supported, between their ends and the pivot axis 9, on the actuating lever 4. The coils of the spring element 7 are supported on a bearing lug 83 of the actuating lever 4, on which the actuating lever 4 is pivotally mounted. If there is no actuating force acting upon the actuating lever 4, it is tensioned into the unactuated position by spring element 7. In order to press the actuating lever 4 into the operating position 13, the spring force of spring element 7 must be overcome.

Figure 11:
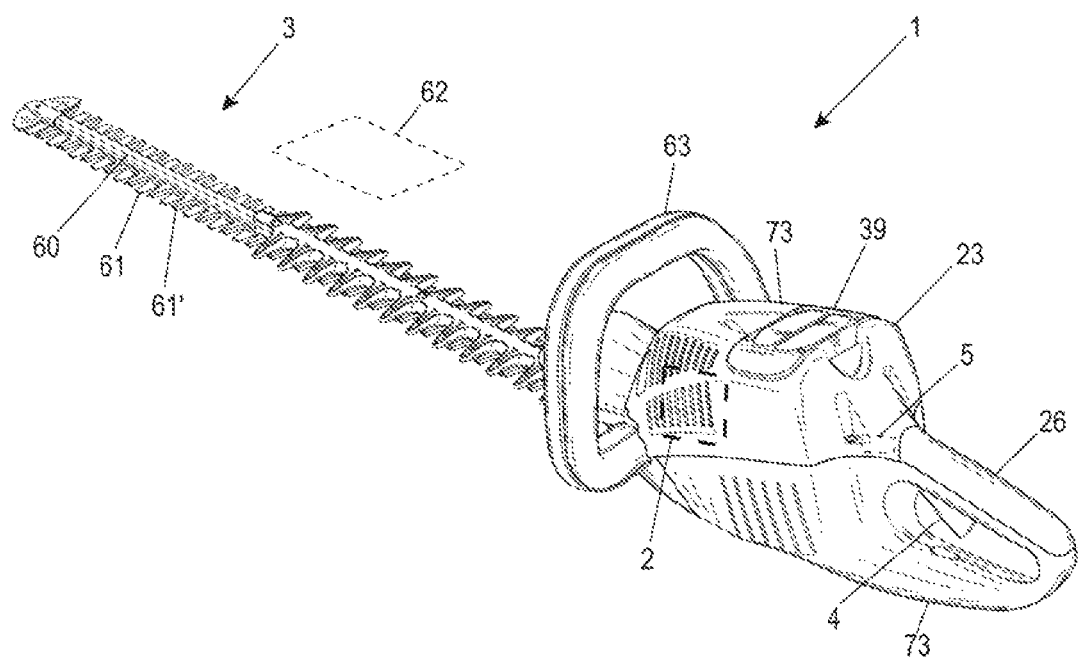
FIG. 11 is a perspective representation of an alternative embodiment of a work apparatus according to the disclosure.

FIG. 11 shows an alternative embodiment of a work apparatus 1 according to the disclosure, namely a hedge trimmer. The same reference signs as in the embodiment shown in FIGS. 1 to 10 denote mutually corresponding components. The work apparatus 1 has, as work tool 3, a cutter bar 60 having two reciprocating cutting blades 61, 61' which determine a cutting plane 62. Accommodated in the housing 23, at one end of the cutter bar 60, there is a drive unit, having the schematically represented drive motor 2, which is powered by the battery 39 connected in the housing 23. The hedge trimmer is an electric hedge trimmer, in particular a battery-operated hedge trimmer. For the purpose of holding and guiding the work apparatus 1, the housing 23 has the handle 26, which is realized as a rear handle in the longitudinal direction of work apparatus 1. The blocking lever 5 arranged on the housing 23 is shown only schematically, in the form of a broken-line rectangle. The actuating lever 4 is also arranged on housing 23.

Figure 12:
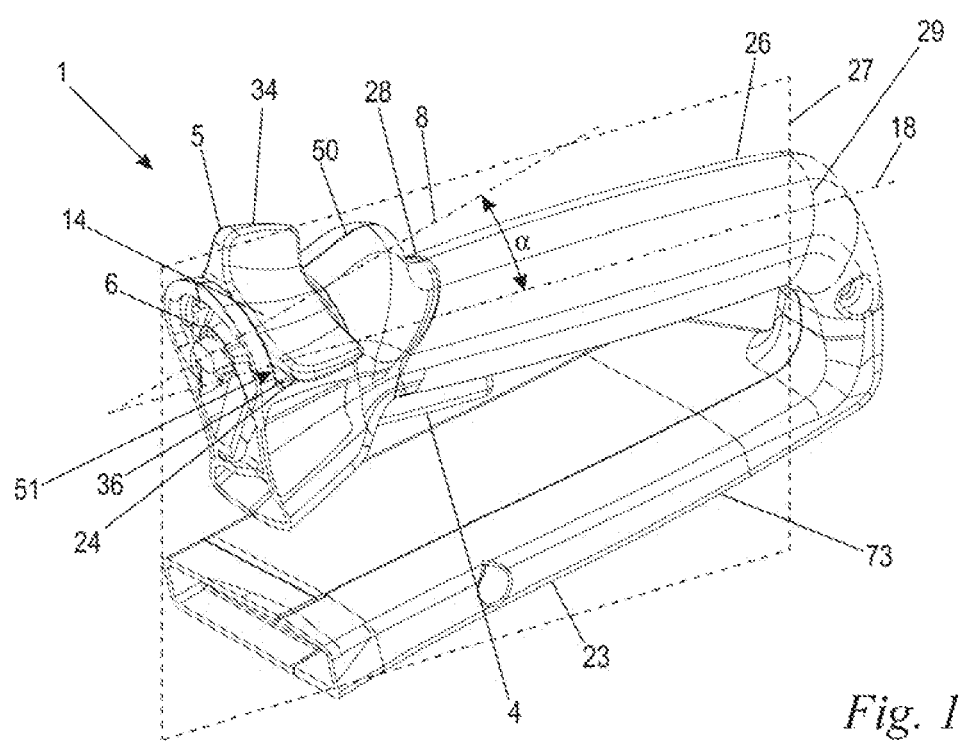
FIG. 12 is a detail perspective representation of a work apparatus with a blocking lever having three wing elements and a spring unit according to the disclosure.

FIG. 12 shows a detail of the part of the housing 23 of the work apparatus 1 according to the disclosure, as per FIG. 11, that includes the handle 26 and on which the blocking lever 5 and the actuating lever 4 are arranged. At its rear end 29, that is, the end of the handle 26 that faces away from the blocking lever 5, the handle 26 merges into a main body 73 of the housing 23. The work apparatus 1 includes a hand stop 50, via which the handle 26 merges at its front end 28 into the main body 73 of the housing 23. The hand stop 50 is realized on the housing 23, at the front end 28 of the handle 26, and extends, in the direction from the actuating lever 4 to the handle 26, away from the handle 26. The hand stop 50 forms a stop for the operator's hand in the direction of the longitudinal axis 18 of the handle 26, toward the front. The hand stop 50 serves as a base for the thumb saddle of the operator. The blocking lever 5 is arranged next to the hand stop 50.

As shown in FIG. 12, in the direction of view perpendicular to the longitudinal plane 27 the longitudinal axis 18 of the handle 26 and the rotational axis 8 of the blocking lever 5 enclose the angle α which opens away from the main body 73 of housing 23. In the embodiment, the angle α is in a range of from 10° to 60°, preferably 15° to 45°. In particular, the angle α is approximately 15° in the direction of view perpendicular to the longitudinal plane 27.

Figure 13:
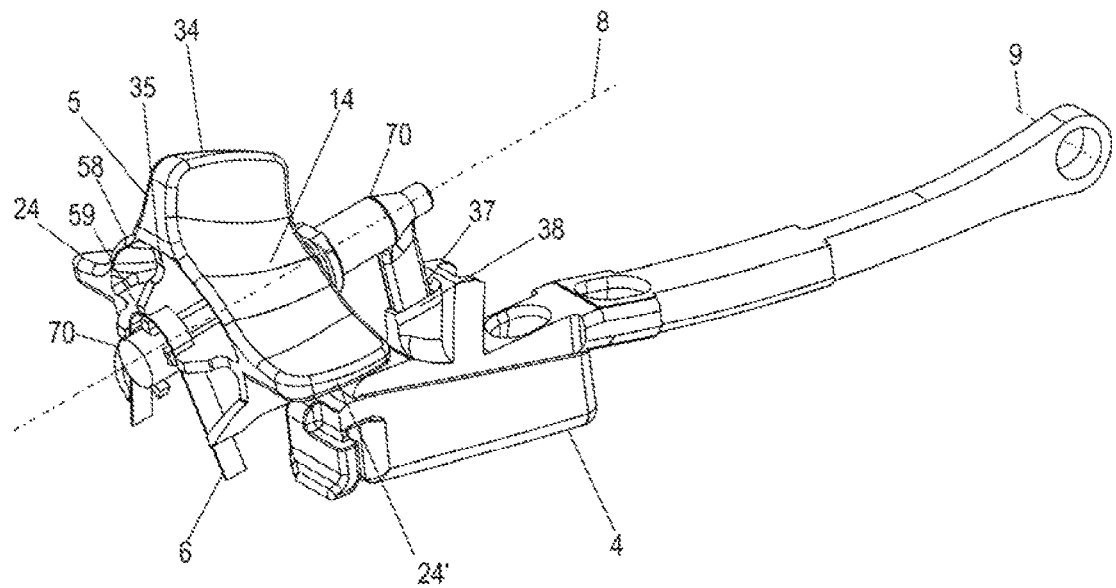
FIG. 13 is a perspective representation of the blocking lever with a spring unit according to FIG. 12.
Figure 14:
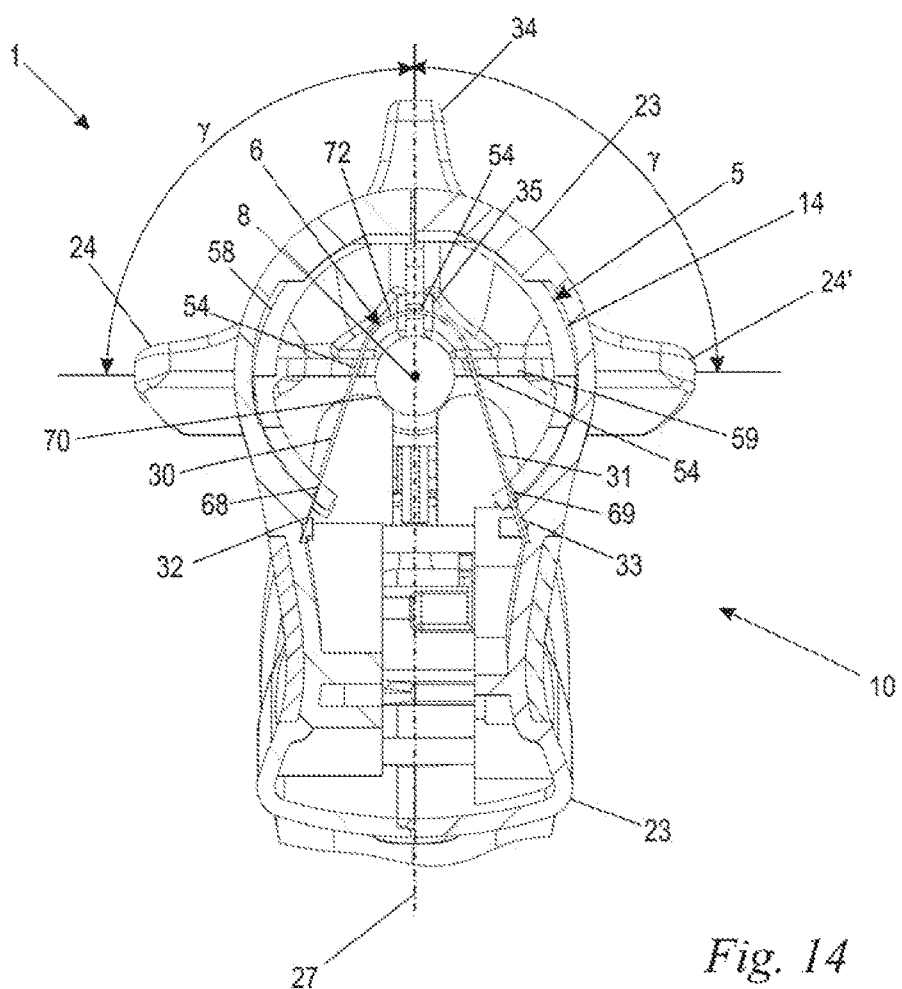
FIG. 14 is a detail sectional representation of the work apparatus according to the disclosure, in the direction of view of the rotational axis of the blocking lever, in the direction from the blocking lever to the actuating lever.

As shown in FIGS. 13 and 14, the blocking lever 5 differs from the blocking lever 5 according to the embodiment in FIG. 1 substantially in that the blocking lever 5 has three wing elements 24, 24', 34 (FIG. 14). The work apparatus according to the disclosure, having such a blocking lever 5 that has three wing elements 24, 24', 34, may also be realized, in an alternative embodiment, for example, as a power saw, blowing device or the like. Moreover, the work apparatus 1 may also be realized as a work apparatus having a shank, for example as a pole-mounted pruner, hedge trimmer, brushcutter, lawn trimmer, power scythe or the like. A further upper wing element 34 is arranged on the blocking lever 5, between the lateral wing elements 24, 24'. The wing elements 24, 24', 34 include one upper wing element 34 and two lateral wing elements 24, 24' in the direction of view of the longitudinal axis 18. The upper wing element 34 lies, in the circumferential direction, between the two lateral wing elements 24, 24'. The upper wing element 34 of the three wing elements 24, 24', 34 is arranged on the blocking lever 5, opposite the actuating lever 4 with respect to the rotational axis 8 of the blocking lever 5. The two lateral wing elements 24, 24' of the three wing elements 24, 24', 34 of the blocking lever 5 are arranged opposite each other on blocking lever 5 with respect to the longitudinal plane 27, in particular in mirror-symmetry. The two lateral wing elements 24, 24' of the blocking lever 5 have an equal angular distance γ, around the rotational axis 8 of the blocking lever 5, from the upper wing element 34. In the embodiment, the angular distance γ is at least 60°, in particular at least 70°, preferably approximately 90°. In the preferred embodiment, the wing elements 24, 24', 34 are realized on the peripheral wall 14 of the blocking lever 5. Accordingly, the wing elements 24, 24', 34 are realized as one piece on the blocking lever 5. As shown in FIG. 12, the housing 23 has a groove 51, which extends by at least 180° around the rotational axis 8 of the blocking lever 5. The blocking lever 5 is arranged in the groove 51, with the wing elements 24, 24', 34 projecting from the groove 51 and thus easily accessible to the operator from outside the housing 23. The blocking lever 5 has only one wall portion 58, which is connected to a shaft 70 of the blocking lever 5 via the central strut 59 and the connecting strut 35. All three wing elements 24, 24', 34 are realized on the wall portion 58.

During use of a hedge trimmer, for example, vertical cuts are made in addition to horizontal cuts in order to cut a hedge. For such vertical cuts, the hedge trimmer must be rotated such that its cutting plane 62 is aligned vertically. The hedge trimmer is then guided by the operator in an upward and downward movement. Usually in this case, the operator changes the hand position from the hand position for horizontal cuts, namely to a hand position rotated by 90°, so that it is not necessary to bend the wrist. In the case of such a rotated hand position, the additional upper wing element 34 allows simple, ergonomic unblocking of the actuating lever 4. The blocking lever 5 can be easily actuated by the thumb via the upper wing element 34.

As shown in FIG. 14, the embodiment for a work apparatus 1 shown here includes an alternative configuration of a spring unit 6, compared to the embodiment shown in FIG. 1. The spring unit 6 biases the blocking lever 5 in the direction of the blocking position 10. The spring unit 6 is realized as a leaf spring, but in an alternative embodiment it may also be realized as a leg spring or similar, or include a plurality of springs. The spring unit 6 includes a first spring leg 30 and a second spring leg 31. The spring legs 30, 31 are connected via a curved portion 72 of the spring unit 6. The spring unit 6 is therefore approximately V-shaped. In the embodiment, the spring unit 6 is realized as one piece. The spring unit 6 is clamped-in on the blocking lever 5. The spring legs 30, 31 in this case project from the peripheral wall of the blocking lever 5, and in the blocking position are directed in the direction of the actuating lever 4. The curved portion 72 of the spring unit 6 extends around part of the circumference of the shaft 70 of blocking lever 5. The spring unit 6 is also clamped-in on blocking lever 5 via three guides 54. Two of the three guides 54 in this case are arranged opposite each other, with respect to the longitudinal plane 27, on the central strut 59. The other guide 54 is realized on the connecting strut 35 of the blocking lever 5. The guides 54 are each realized as a slot, in particular as an opening. The spring unit is clamped-in in the guides 54, in particular in the guides 54 provided on the central strut 59.

Figure 15:
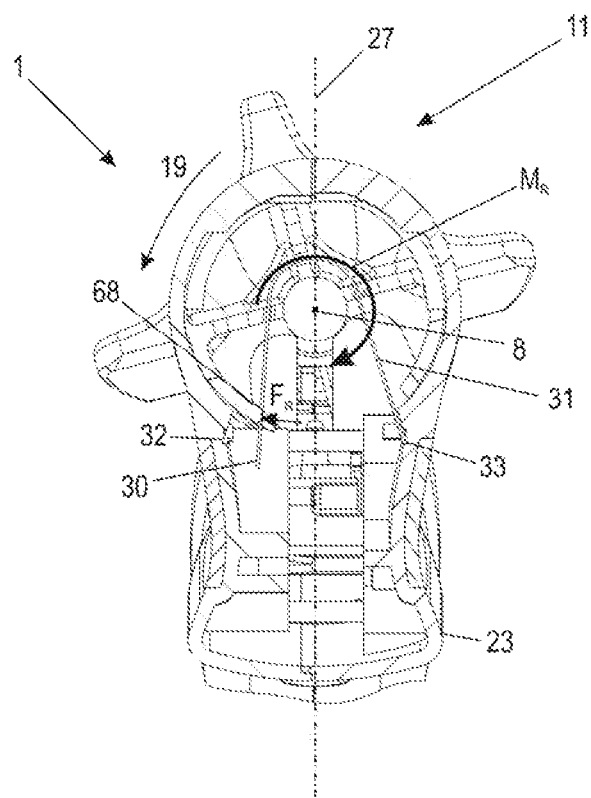
FIG. 15 is a detail sectional representation according to FIG. 14, in a first enable position.
Figure 16:
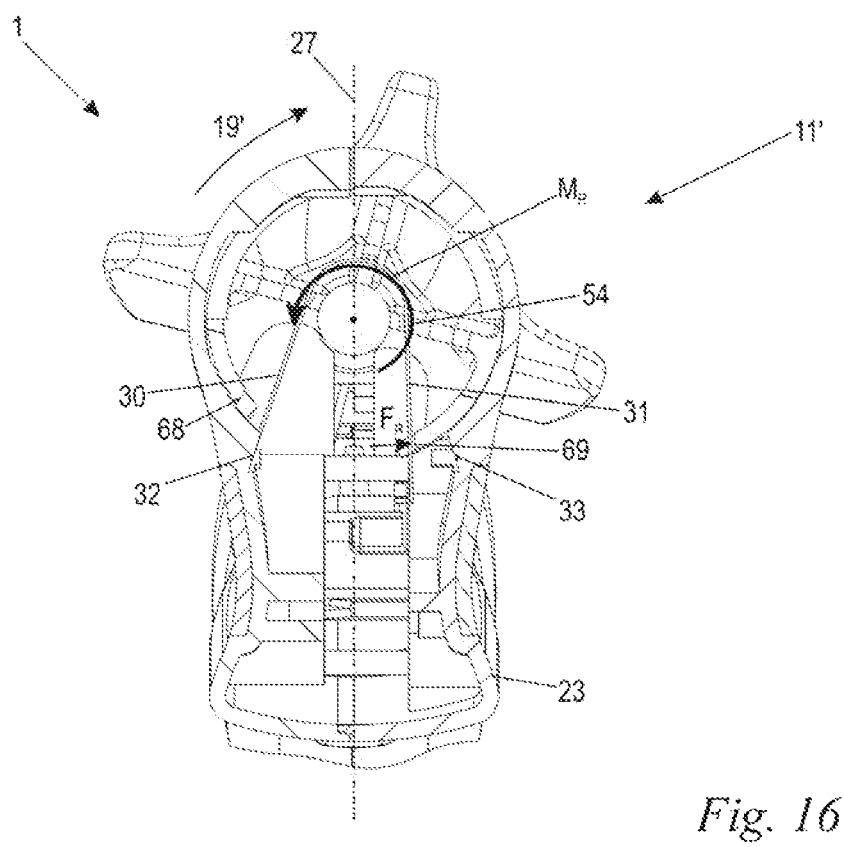
FIG. 16 is a detail sectional representation according to FIG. 14, in a second enable position.

As shown in FIGS. 14 to 16, the housing 23 forms a first rotational stop 32 and a second rotational stop 33. A first stop surface 68 and a second stop surface 69 are realized on the blocking lever 5. In the preferred embodiment, the stop surfaces 68, 69 are realized at the ends of the wall portion 58. The spring unit 6 is arranged opposite the housing 23 in such a manner that, when the blocking lever 5 is pivoted in the first pivot direction 19, the first spring leg 30 of the spring unit 6 is deflected by the first stop surface 68 of the blocking lever 5 in the direction of the longitudinal plane 27. The spring unit 6 in this case is supported, via the second spring leg 31, on the second rotational stop 33 of the housing 23 (FIG. 15). The spring unit 6 acts with a spring force upon the stop surface 68 of the blocking lever 5. In the embodiment, the second spring leg 31 bears approximately flatly against the stop surface 68, as a result of which the spring force corresponds approximately to the restoring force $F_R$ acting upon the blocking lever. The restoring force $F_R$ in turn generates the restoring moment $M_R$, by which the blocking lever 5 is pivoted from the enable position 11 back into the blocking position 10. If the blocking lever 5 is deflected in the second pivot direction 19', the second spring leg 31 is deflected, via the second stop surface 69 of the blocking lever 5, in the direction of the longitudinal plane 27. The spring unit 6 in this case is supported, via the first spring leg 30, on the first rotational stop 32 of the housing 23 (FIG. 16). The acting forces are realized in a manner similar to that of the first spring leg 30. The restoring force $F_R$ is equal in magnitude in both pivot directions 19, 19' for an equal deflection. The spring unit 6 is realized symmetrically in relation to the longitudinal plane 27. The blocking lever 5 is also realized symmetrically in relation to the longitudinal plane 27. Consequently, restoring forces $F_R$ of equal magnitude and restoring moments $M_R$ of equal magnitude are generated for the two differing pivot directions 19, 19'.

Figure 17:
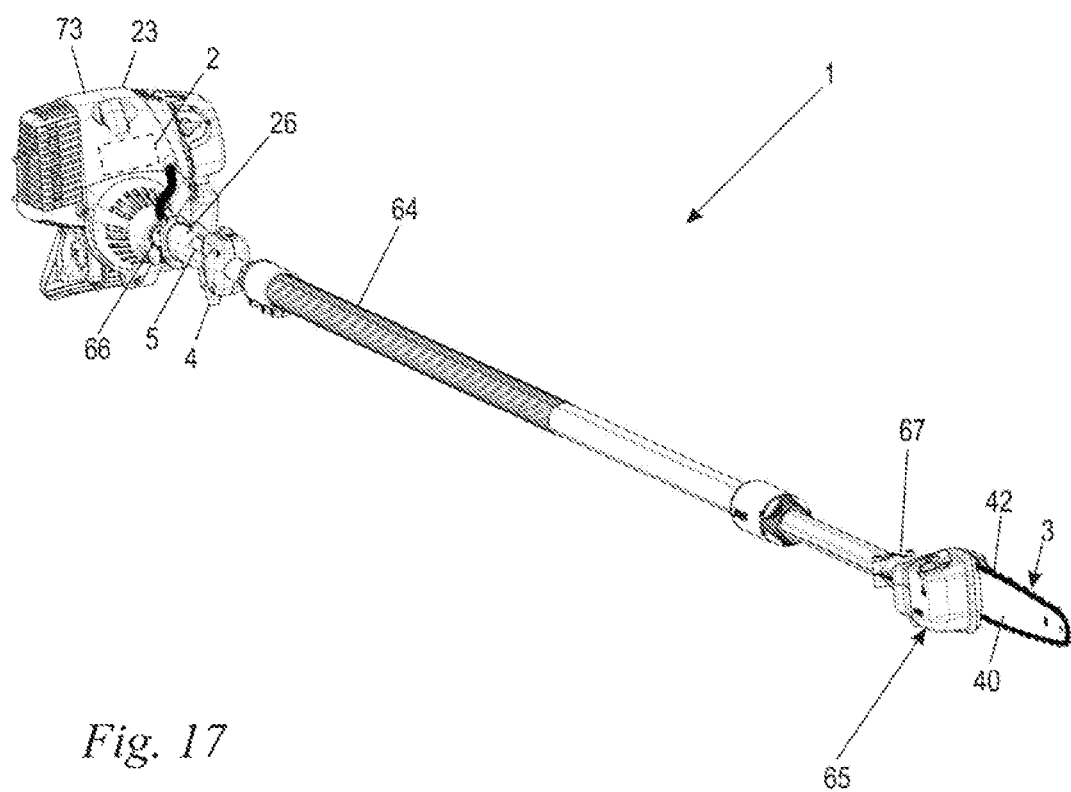
FIG. 17 is a perspective representation of an alternative embodiment of a work apparatus according to the disclosure, with shank.

In FIG. 17, a pole-mounted pruner is shown as an alternative embodiment of a work apparatus 1 according to the disclosure. The same references according to the embodiment in FIGS. 1 to 10 and the embodiment in FIGS. 11 to 16 denote mutually corresponding components. The work apparatus 1 includes the drive unit, which is connected to a cutter head 65 via a shank that includes a guide tube 64. The shank, or guide tube 64, forms part of the housing 23. The drive unit is arranged in the housing 23, and includes the drive motor 2, which is represented schematically. In the embodiment, the drive motor 2 is realized as an internal combustion engine. In a preferred alternative embodiment of the work apparatus 1 according to the disclosure, the drive motor 2 is an electric motor. It may also be provided that the drive motor 2 is arranged on the cutter head 65, in particular if the drive motor 2 is an electric motor. A battery 39, for supplying power to the drive motor 2, may then be provided, for example, in the housing 23. In the embodiment, the guide tube 64 is configured as a telescopic tube. The guide tube 64 has a first end 66, to which the drive unit is fixed. Adjacent to the first end 66 of the guide tube 64, the handle 26 is fixed to the guide tube 64. The actuating lever 4 and the blocking lever 5, represented schematically, are mounted on the handle 26. The cutter head 65 is arranged at a second end 67 of the guide tube 64. A drive shaft may project through the guide tube 64 if the drive motor 2 is arranged in the main body 73 of the housing 23. If the drive motor 2 is mounted on the cutter head 65, power and signal lines are advantageously routed through the guide tube 64.

Figure 18:
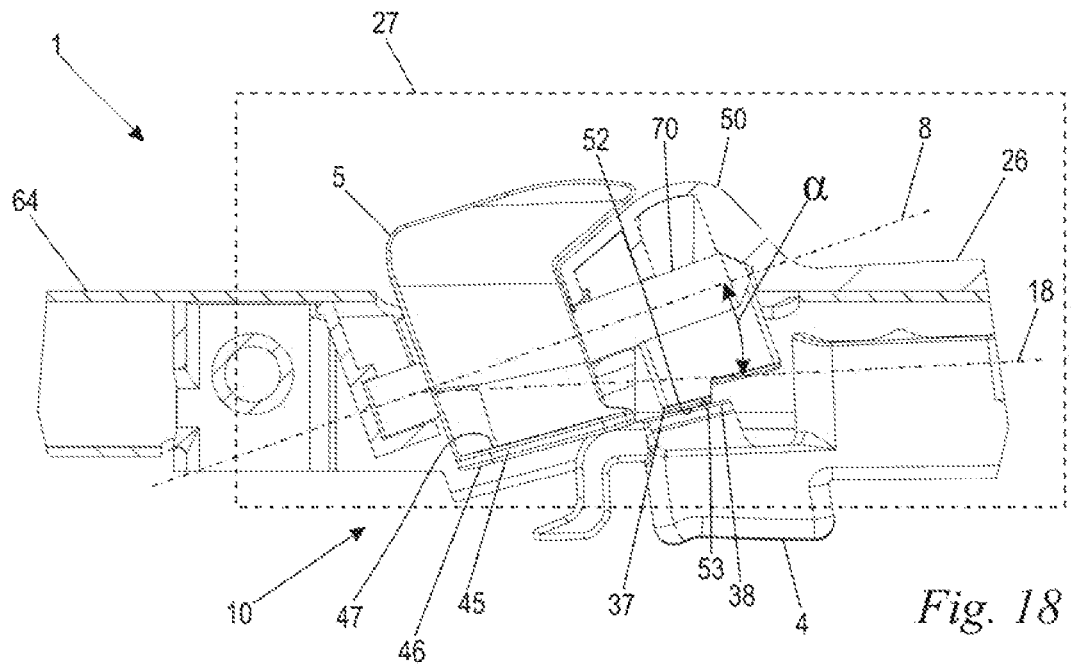
FIG. 18 is a detail sectional representation of the blocking lever of the work apparatus from FIG. 17, on the handle, in a blocking position, in direction of view perpendicular to the longitudinal plane.
Figure 19:
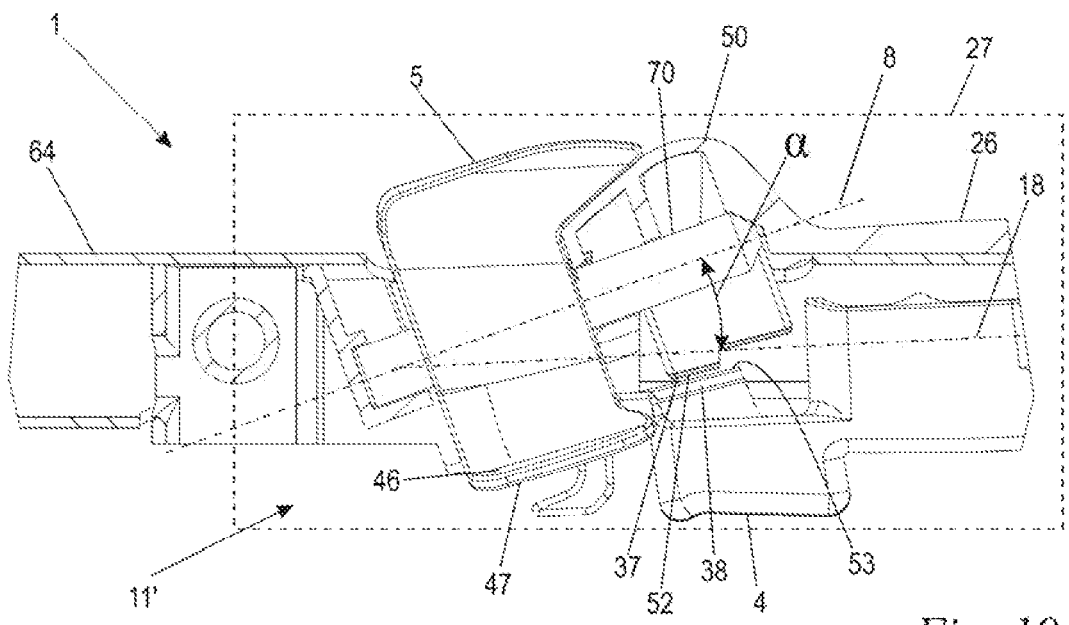
FIG. 19 is a detail sectional representation of the blocking lever, on the handle, as shown in FIG. 18, in an enable position.

FIGS. 18 and 19 show the guide tube 64, the handle 26, the actuating lever 4 and the blocking lever 5 in a lateral detail sectional representation of the work apparatus 1 according to FIG. 17. Also in this embodiment of work apparatus 1, the longitudinal axis 18 of handle 26 and the rotational axis 8 of blocking lever 5 enclose the angle α in the direction of view perpendicular to the longitudinal plane 27. The angle α is in a range of between 10° and 60°, preferably between 15° and 45°. The angle α in the embodiment is, in particular, approximately 15°.

Figure 20:
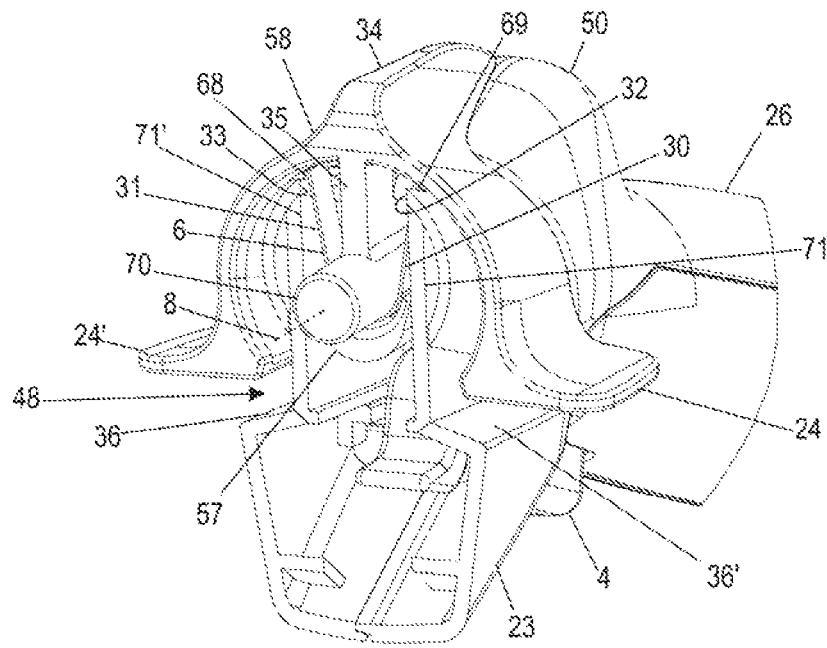
FIG. 20 is a perspective representation of the blocking lever with spring unit of a work apparatus with shank as shown in FIG. 18.
Figure 21:
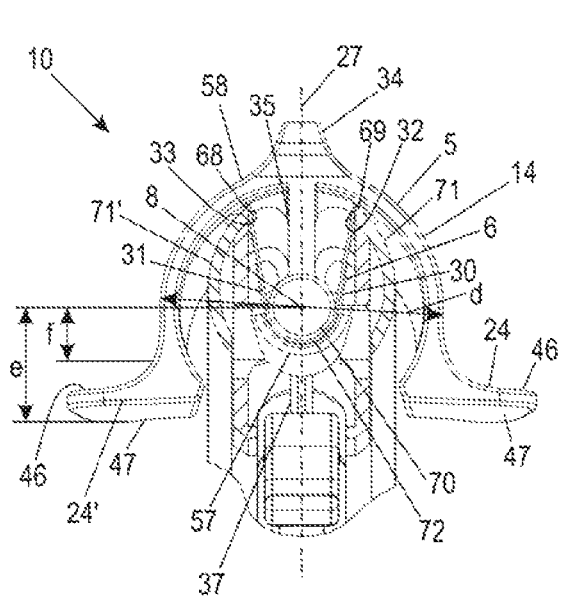
FIG. 21 is a detail sectional representation of the work apparatus according to FIG. 18, on the blocking lever, in the direction of view, parallel to the rotational axis, from the blocking lever in the direction of the actuating lever; and, FIG. 22 is a detail sectional representation of the work apparatus as shown in FIG. 21, in a blocking position.
Figure 22:
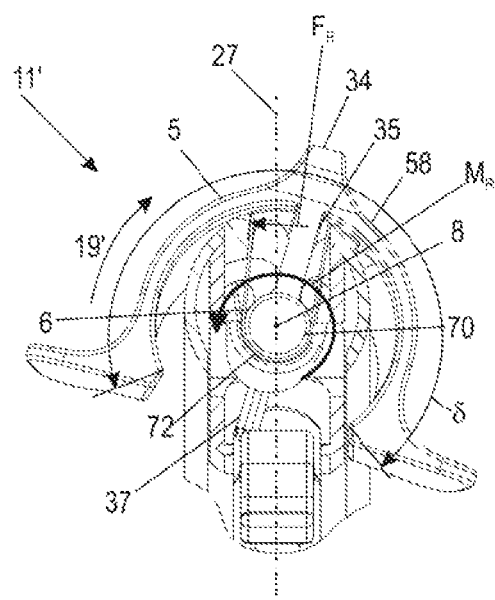

As shown in FIGS. 20 to 22, the blocking lever 5 has a shaft 70, which is mounted in housing 23 so as to be pivotable about the rotational axis 8 of blocking lever 5. The wall portion 58 is connected to the shaft 70 via the connecting strut 35. When the blocking lever 5 is in the blocking position, the connecting strut 35 is arranged in the longitudinal plane 27. In the embodiment, the shaft 70 and the blocking lever 5 are realized as one piece. The shaft 70 includes an extension, on which the flag 37 is realized. As shown in FIGS. 18, 21, the flag 37 of the shaft 70 blocks the actuating lever 4 in its pivot direction for actuation of the drive motor 2. Upon actuation of the actuating lever 4, the end face 52 of the flag 37 and the counter end face 53 of counterflag 38 contact each other. The actuating lever 4 is blocked. The blocking lever 5 is in the blocking position 10. In FIGS. 19 and 22 the blocking lever 5 has been pivoted in the second pivot direction 19', such that the flag 37 enables the counterflag 38. The actuating lever 4 can be actuated, that is, pressed in the direction of the rotational axis 8 of the blocking lever 5, without the flag 37 and the counterflag 38 contacting each other. The blocking lever 5 is in the second enable position 11'.

As shown in FIGS. 20 to 22, the three wing elements 24, 24', 34 are realized on the blocking lever 5. The blocking lever 5 differs from the blocking lever 5 shown in FIG. 12 in that, in the blocking position 10, both the maximum distance e and the minimum distance f between the lateral wing elements 24, 24' and the rotational axis 8 of the blocking lever 5 are greater. The maximum distance e corresponds to at least 15%, preferably at least 25%, in particular approximately 30% of the diameter d of the blocking leader 5. The minimum distance f corresponds to at least 5%, in particular at least 10% of the diameter d of the blocking lever 5. The wall portion 58 extends over the angle δ (FIG. 22) around the rotational axis 8 of the blocking leader 5, the angle δ being at least 180°, in particular at least 200°, preferably approximately 250°.

Such work apparatuses 1 having a shank, in particular a pole-mounted pruner or hedge trimmer, are used for cutting operations on trees or high hedges. The operator in this case holds the work apparatus 1 with the shank pointing upwards. The handle 26 must therefore be held in an angled position. It has been shown that it is comfortable for the operator if the thumb is at a large distance from the rotational axis 8 of the blocking lever 5 in the direction of the actuating lever 4. Owing to the deep arrangement of the lateral wing elements 24, 24' on the blocking lever 5, the distances e, f of the lateral wing elements 24, 24' from the rotational axis of the blocking lever 5 are significantly increased. This results in a relaxed grip position for the operator, in particular in the case of an angled hand position.

FIGS. 20 to 22 show the spring unit 6, which differs in its installation position from the spring unit of the embodiment according to FIG. 12. The spring unit 6 likewise has a first spring leg 30 and a second spring leg 31, which are connected to each other via a curved portion 72. The spring unit 6 is approximately V-shaped. However, spring unit 6 is installed rotated by 180° with respect to the rotational axis 8 of the blocking lever 5. The spring legs 30, 31 extend away from actuating lever 4 in the direction of the upper wing element 34. The spring unit 6 is clamped-in between the shaft 70 of the blocking lever 5 and a shaft receiver 57 provided for the blocking lever 5. The spring legs 30, 31 extend approximately to the inner side of the blocking lever 5. Realized on the inner side of the blocking lever 5 are the stop surfaces 68, 69 for supporting the spring legs 30, 31. The first rotational stop 32 and the second rotational stop 33 are realized by the housing 23, in particular by the main body of the housing 23 or by recesses in the guide tube 64. The housing 23 extends via two struts 71, 71' into the interior of the blocking lever 5. The struts 71, 71' are realized opposite each other with respect to the longitudinal plane 27. The two struts 71, 71' extend approximately up to the two stop surfaces 68, 69, without contacting them. The rotational stops 32, 33 are realized at the ends of the struts 71, 71'. In an alternative embodiment according to the disclosure, the rotational stops 32, 33 are formed either by the main body of the housing 23 or by the guide tube 64.

As also in the embodiment according to FIG. 12, the first rotational stop 32 blocks the rotational movement of the first spring leg 30 in the second pivot direction 19'. The spring unit 6 in this case, via its second spring leg 31, effects a restoring force $F_R$ upon the blocking lever 5, which biases the blocking lever 5 back into its blocking position 10. The first spring leg 30 is supported on the first rotational stop 32, the second spring leg 31 acting upon the blocking lever 5 via the first stop surface 68 of the blocking lever 5. The second rotational stop 33 limits a rotational movement of the second spring leg 31 in the first pivot direction 19. The second spring leg 31 is accordingly deflected at the second rotational stop 33. The first spring leg 30 effects a restoring force $F_R$, which biases the blocking lever 5, via the second stop surface 69, contrary to the first pivot direction 19, back into the blocking position 10, the first spring leg 30 being supported on the first rotational stop 32. Opposite the blocking lever 5, the spring legs 30, 31 are clamped-in on the stop surfaces 68, 69 realized on the inner side of the blocking lever 5. The spring unit 6 is biased in blocking position 10, in particular clamped-in between the shaft 70 and the shaft receiver 57, and between the two stop surfaces 68, 69.

It is understood that the foregoing description is that of the preferred embodiments of the invention and that various changes and modifications may be made thereto without departing from the spirit and scope of the invention as defined in the appended claims.

The invention claimed is:
1. A portable handheld work apparatus comprising:
a work tool;
a drive motor for driving said work tool;
a handle defining a longitudinal axis;
an actuating lever for operating said drive motor;
a blocking lever for said actuating lever;
said blocking lever defining a rotational axis and being journalled to pivot about said rotational axis;
said work apparatus defining a longitudinal plane containing said longitudinal axis of said handle therein;
said longitudinal plane running parallel to said rotational axis of said blocking lever;
said blocking lever being pivotable into a disable position wherein said actuating lever is blocked and into at least one enable position wherein said actuating lever is enabled for actuation;
said longitudinal axis of said handle and said rotational axis of said blocking lever conjointly defining an angle (a) when viewed in a direction perpendicular to said longitudinal plane; and,
said angle (a) lying in a range of 10° to 60°;
a handle extending from a handle back end to a handle front end;
said actuating lever being arranged on said handle;
a handstop formed at said handle front end;
said handstop being a stop for a hand of an operator and configured to serve as a base for a thumb saddle of the operator; and,
wherein said rotational axis of said blocking lever intersects said handstop.
2. The handheld work apparatus of claim 1, wherein the angle (a) lies in a range of 15° to 45°.
3. The handheld work apparatus of claim 1, wherein said at least one enable position is a first enable position and said blocking lever is pivotable into a second enable position; and,
said blocking lever, starting from said disable position, is pivotable about said rotational axis into said first enable position in a first pivot direction and is pivotable about said rotational axis into said second enable position in a second pivot direction opposite said first pivot direction.
4. The handheld work apparatus of claim 3 further comprising a spring unit configured to effect a restoring force in response to an angular deflection of said blocking lever starting from said disable position with said restoring force being the same in magnitude for the same angular deflection in said first pivot direction and in said second pivot direction.
5. A portable handheld work apparatus comprising:
a work tool, wherein said work tool is a guide bar with a saw chain and said saw chain is arranged peripherally on said guide bar;
a drive motor for driving said work tool;
a handle defining a longitudinal axis;
an actuating lever for operating said drive motor;
a blocking lever for said actuating lever;
said blocking lever defining a rotational axis and being journalled to pivot about said rotational axis;
said work apparatus defining a longitudinal plane containing said longitudinal axis of said handle therein;
said longitudinal plane running parallel to said rotational axis of said blocking lever;
said blocking lever being pivotable into a disable position wherein said actuating lever is blocked and into at least one enable position wherein said actuating lever is enabled for actuation;

said longitudinal axis of said handle and said rotational axis of said blocking lever conjointly defining an angle (α) when viewed in a direction perpendicular to said longitudinal plane;

said angle (α) lying in a range of 10° to 60°; and, wherein said blocking lever and said actuating lever are mutually arranged such that, in a state where said handle is being held by a hand, said blocking lever is configured to be pushed/pressed with a thumb of the hand and as a result, said actuating lever, which is unblocked thereby, is configured to be actuatable with an index finger or another free finger of the hand.

6. A portable handheld work apparatus comprising:

a work tool;

a housing;

a drive motor arranged in said housing and configured to drive said work tool;

a handle defining a longitudinal axis;

an actuating lever for operating said drive motor;

a blocking lever for said actuating lever;

said blocking lever defining a rotational axis and being journalled to pivot about said rotational axis;

said work apparatus defining a longitudinal plane containing said longitudinal axis of said handle therein;

said longitudinal plane running parallel to said rotational axis of said blocking lever;

said housing having an upper side and a lower side which are intersected by the longitudinal plane;

said housing having two lateral sides which connect said upper side to said lower side;

said blocking lever being pivotable into a disable position wherein said actuating lever is blocked and into at least one enable position wherein said actuating lever is enabled for actuation;

said longitudinal axis of said handle and said rotational axis of said blocking lever conjointly defining an angle (α) when viewed in a direction perpendicular to said longitudinal plane;

said angle (α) lying in a range of 10° to 60°;

said blocking lever includes a lateral wing element arranged on a first of said two lateral sides of said housing.

7. The portable handheld work apparatus of claim 6, wherein said lateral wing element is a first lateral wing element; and, said blocking lever includes at least two lateral wing elements, wherein a second of said at least two lateral wing elements is arranged on a second of said two lateral sides.

8. The portable handheld work apparatus of claim 7, wherein:

said housing defines an opening in each of said two lateral sides, wherein said openings are formed separately from each other;

said first of said at least two lateral wing elements extends through said opening in said first lateral side; and, said second of said at least two lateral wing elements extends through said opening in said second lateral side.

9. The portable handheld work apparatus of claim 7, wherein each of said at least two lateral wing elements extend perpendicularly away from said longitudinal plane.

10. The portable handheld work apparatus of claim 7, wherein said at least two lateral wing elements lie in a plane with said rotational axis of said blocking lever; and, said plane is perpendicular to said longitudinal plane.

11. The portable handheld work apparatus of claim 6, wherein said rotational axis of said blocking lever and a rotational axis of said drive motor lie in a plane.

12. The portable handheld work apparatus of claim 11, wherein, in a side view of the work apparatus, a rotational axis of the drive motor and said rotational axis of said blocking lever intersect at an angle smaller than 30°.

13. The portable handheld work apparatus of claim 6, wherein said blocking lever is arranged below said electric motor and above a throttle.

* * * * *